A. KIPNISS.
DRILL CHUCK.
APPLICATION FILED FEB. 26, 1919.

1,405,921.

Patented Feb. 7, 1922.

INVENTOR
Abraham Kipniss
BY Williams & Pritchard
ATTORNEYS

UNITED STATES PATENT OFFICE.

ABRAHAM KIPNISS, OF ARVERNE, NEW YORK, ASSIGNOR TO PROGRESSIVE MACHINE AND METAL PRODUCTS CO., INC., A CORPORATION OF NEW YORK.

DRILL CHUCK.

1,405,921.  Specification of Letters Patent.  Patented Feb. 7, 1922.

Application filed February 26, 1919. Serial No. 279,346.

*To all whom it may concern:*

Be it known that I, ABRAHAM KIPNISS, a citizen of the United States, and residing at Arverne, county of Queens, State of New York, have invented certain new and useful Improvements in Drill Chucks, of which the following is a specification.

This invention consists in a drill chuck, of the generic character disclosed and claimed in the co-pending application of Max Paul Neumann and myself, Serial No. 207,521, filed December 17, 1917.

Objects of the present invention are to simplify and cheapen the drill chuck, and facilitate its manipulation in use.

Figure 1:
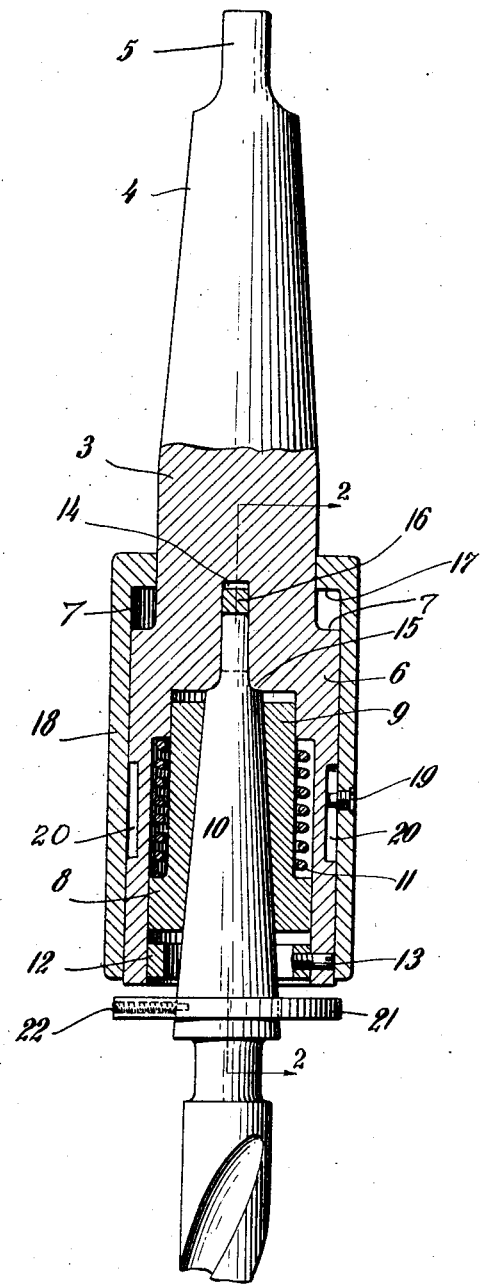
Figure 2:
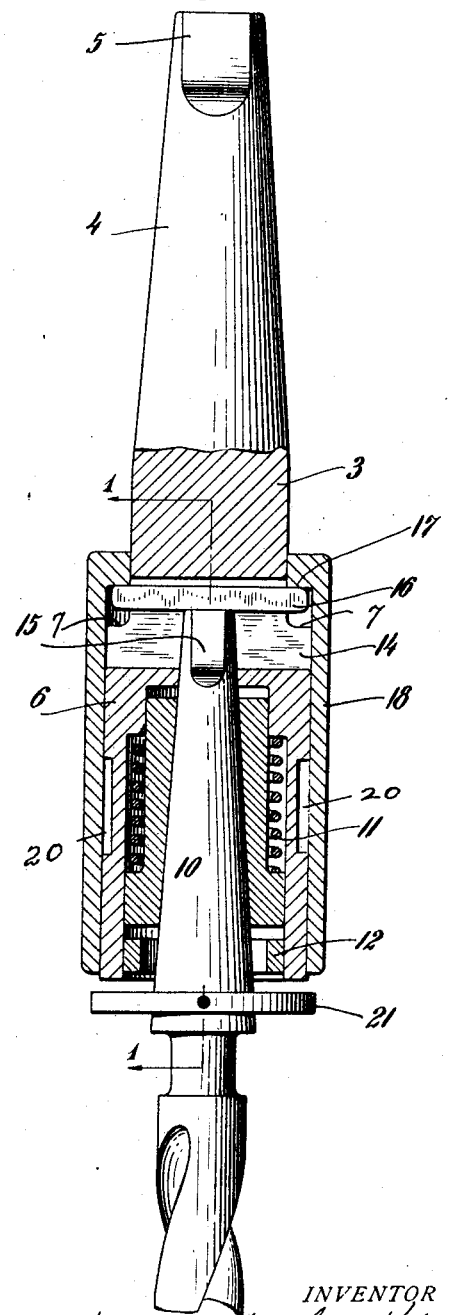

One adaptation of the present invention is shown in the accompanying drawings, in which:

Figure 1 is a sectional elevation in a plane transverse to the plane of the drill tang, and Figure 2 is a sectional elevation in the plane of the drill tang.

In these drawings the parts are shown in operating positions with the full thrust of the drill press applied to the drill.

The main body 3 has a tapered shank 4 with a flattened tang 5 adapted to be received and driven by the drill socket of the drill press.

The lower part of the main body is formed into an enlarged cylinder 6 presenting a shoulder 7. This cylindrical end of the main body is bored and counter-bored to receive respectively the head 8 and tube 9 of the tapered drill socket which holds the tapered drill shank 10.

A spring 11 surrounds this drill socket, and is compressed between its head and the shoulder formed between the bore and counter-bore of the main body. Normally, while thrust is not being applied to the drill, the drill socket 8, 9 is forced downward by the spring, against the stop ring 12 secured in the mouth of the main body by means of a screw 13. A transverse slot 14 extends through the main body above its counter-bore, and communicates therewith to receive the drill tang whose thrust is supported by the bearing of its curved shoulders 15 against corresponding corners formed at the upper end of the counter-bore of the drill socket.

A bar 16 extends through the slot 14, so as to be lifted by the drill tang, and the protruding ends of this bar support the inner flange 17 formed in the upper end of the drill-releasing or knockout sleeve 18 which freely turns and slides longitudinally on the cylindrical part of the main body. A screw 19 passing through the sleeve, enters an annular slot 20 in the main body, to retain the sleeve thereon.

To facilitate the insertion of the drill, while the drill chuck is rotating, the drill may have a washer 21 driven on its tapered shank, and also secured by a screw 22 if desired.

As the spring 11 is compressed by the drill thrust, the movement of the drill and the socket 9, upward into the main body, is arrested by the shoulder 15 before the socket engages the end of the counter-bore in the main body; so that the thrust of the tapered drill shank in the tapered aperture of the drill socket, is limited to the pressure of the spring, and does not become so firmly set as to jam and resist ejection. As the thrust on the drill is relieved, the spring restores the drill socket into contact with the stop ring 12, while the cross bar 16 lies on top of the drill tang. To eject the drill, the knockout sleeve 18 is lifted and brought down upon the knockout bar 16 which transmits the drill-ejecting impact to the end of the drill tang. Since the knockout sleeve turns freely on the main body, it may be grasped in the hand to thus eject the drill while the drill press and chuck are turning.

I claim—

1. A tool chuck comprising a main body having a hollow cylindrical outer part, a tool-centering socket freely rotatable and longitudinally slidable within said hollow main body part and having a tapered bore adapted to receive the tapered shank of a tool, a spring within said hollow main body part tending to move said socket outward against the working thrust of the tool and into tool-holding engagement with the tapered shank of the tool, said main body part of the chuck having transversely therethrough a longitudinally slotted opening adapted to receive the flattened end of the tool shank for thereby transmitting rotation to the tool, a tool-ejecting member extending through said slotted opening in engagement with the inner end of said tool shank and at its opposite ends projecting laterally from said slotted opening in the main body part of the chuck, and a knockout sleeve within which said main body part is adapted to rotate and mounted thereon for longitudinal movement and adapted in such longitudinal movement to strike against the projecting ends of said tool-ejecting member for thereby disengaging the tapered shank of the tool from said socket.

2. The invention claimed in claim 1 in which the said slotted opening through said main body part of the chuck is made of sufficient width that the working thrust upon the tool will be received by the shoulders formed at the entrance to said slotted opening, these shoulders forming abutments for the corresponding shoulders on the tool shank formed between the said flattened end part and the tapered part of said tool shank.

3. The invention claimed in claim 1 in which said hollow cylindrical main body part is provided with a counterbore forming an annular shoulder and in which said socket has a reduced inner part slidable in said counter-bore and has an outer larger head part forming an annular shoulder, and in which said spring is a coiled thrust spring surrounding the reduced part of said socket and acting between the shoulder within said main body part and the shoulder on said socket, and an abutment within the outer end of said main body part for the outer end of said socket.

4. The invention claimed in claim 2 in which said hollow cylindrical main body part is provided with a counterbore forming an annular shoulder and in which said socket has a reduced inner part slidable in said counterbore and has an outer larger head part forming an annular shoulder, and in which said spring is a coiled thrust spring surrounding the reduced part of said socket and acting between the shoulder within said main body part and the shoulder on said socket, and an abutment within the outer end of said main body part for the outer end of said socket.

In testimony whereof, I have affixed my signature to this specification.

ABRAHAM KIPNISS.